United States Patent
Moussaoui

(10) Patent No.: US 11,716,991 B2
(45) Date of Patent: Aug. 8, 2023

(54) BIOSTIMULANTS FOR ENHANCING CROP PRODUCTIVITY, METHODS AND USES THEREOF

(71) Applicant: 8874034 CANADA INC., Montreal (CA)

(72) Inventor: Redouane Moussaoui, Montreal (CA)

(73) Assignee: 8874034 Canada Inc., Montreal (CA)

( * ) Notice: Subject to any disclaimer, the term of this patent is extended or adjusted under 35 U.S.C. 154(b) by 680 days.

(21) Appl. No.: 16/736,429

(22) Filed: Jan. 7, 2020

(65) Prior Publication Data

US 2020/0214286 A1 Jul. 9, 2020

Related U.S. Application Data

(60) Provisional application No. 62/789,034, filed on Jan. 7, 2019.

(51) Int. Cl.
| | | |
|---|---|---|
| *A01N 63/50* | (2020.01) | |
| *A01N 37/44* | (2006.01) | |
| *A01N 43/16* | (2006.01) | |
| *A01N 65/44* | (2009.01) | |
| *A01N 33/02* | (2006.01) | |
| *A01G 24/30* | (2018.01) | |
| *A01N 65/03* | (2009.01) | |

(52) U.S. Cl.
CPC ............ *A01N 33/02* (2013.01); *A01G 24/30* (2018.02); *A01N 37/44* (2013.01); *A01N 63/50* (2020.01)

(58) Field of Classification Search
None
See application file for complete search history.

(56) References Cited

U.S. PATENT DOCUMENTS

| | | | | |
|---|---|---|---|---|
| 4,383,845 A | * | 5/1983 | Rutherford | C05F 1/002 71/23 |
| 2006/0234866 A1 | * | 10/2006 | Freire | A01N 43/38 504/298 |
| 2017/0318807 A1 | * | 11/2017 | Silverman | A01N 37/42 |

OTHER PUBLICATIONS

Casmino Acids. In Encyclopedic Dictionary of Genetics, Genomics and Proteomics, G.P. Redei (Eds.). 2004. Retrieved from Wiley Online Library: https://doi.org/10.1002/0471684228.egp01785.*
"Maxicrop Seaweed Extract." 1998 Maxicrop.com webpage, <https://maxicrop.com>. Internet Archive from 1998: <https://archive.org/web/19980624085957/http://www.maxicrop.com:80/ >.*
Crouch, I.J., The effect of seaweed concentrate on plant growth. 1990. Retrieved from the Internet:<https://ukzn-dspace.ukzn.ac.za/bitstream/handle/10413/10513/Crouch_I_J_1990.pdf?sequence=1 &isAllowed=y>.*
MacKinnon, S.L. et al., "Improved methods of analysis for betaines in Ascophyllum nodosum and its commercial seaweed extracts," Journal of Applied Phycology, vol. 22, pp. 489-494 (2010).*
Battacharyya, D. et al., "Seaweed extracts as biostimulants in horticulture," Scientia Horticulturae, vol. 196, pp. 39-48 (2015).*

* cited by examiner

*Primary Examiner* — John Pak
(74) *Attorney, Agent, or Firm* — Benoit & Côté Inc.

(57) ABSTRACT

A biostimulant composition comprising an amino acid, a polysaccharide, a betaine, a polyol, an enzyme and a plant hormone is disclosed herein. The biostimulant compositions are useful for enhancing the biomass of a horticultural, arboricultural or an agricultural crop. The biostimulant compositions are also useful for enhancing at least one of enhancing protein content, sugar content, trace element content, resistance to bruising, or preservation capacity.

16 Claims, 6 Drawing Sheets

C                              D

E

F

BIOSTIMULANTS FOR ENHANCING CROP PRODUCTIVITY, METHODS AND USES THEREOF

FIELD

Figure 1:

The present disclosure broadly relates to novel biostimulants for enhancing crop productivity. More specifically, but not exclusively, the present disclosure relates to biostimulants for increasing and improving crop production while reducing ecological impact. The present disclosure also relates to methods and uses thereof.

BACKGROUND

The history of agriculture is marked by great leaps in productivity, from the invention of the plow to mechanization, as well as chemistry and genetics. In recent years, however, the enhancement of yields using conventional products and methods is running out of steam. Additionally, agricultural practices are increasingly questioned by environmentalists and even by consumers. In fact, several modern practices and technologies are viewed negatively by consumers who turn to alternative products, such as biological products. In the years to come, it is believed that the environment will be one of the most important concerns. Sustainable development is viewed as a promising source of both economic and social development. The replacement of conventional methods by alternative methods is viewed as a promising avenue.

Alternative methods such as biological fertilizers aim to enhance crop productivity by increasing crop production and improving crop nutritional value while reducing the ecological impact of the culture. For instance, considering that agriculture will become both intensive and ecological (i.e. "eco-intensification"), it will require novel agricultural practices for a more sustainable approach to crop production, such as agricultural crops, arboricultural crops and horticultural crops. The development of efficient and cost-effective biological compositions and methods employing these biological compositions in a perspective of sustainable crop is desirable.

SUMMARY

The present disclosure broadly relates to novel biostimulants for enhancing crop productivity. More specifically, but not exclusively, the present disclosure relates to biostimulants for increasing and improving crop production while reducing ecological impact. The present disclosure also relates to methods and uses thereof.

In an aspect, the present disclosure relates to a biostimulant composition comprising at least one of an amino acid; a polysaccharide; a betaine; a polyol; an enzyme; or a plant hormone; wherein the biostimulant composition provides nutritional support and/or enhances cellular energy in a plant and/or a tree.

In an aspect, the present disclosure relates to a biostimulant composition comprising an amino acid; a polysaccharide; a betaine; a polyol; an enzyme; and a plant hormone. In an embodiment of the present disclosure, the biostimulant composition provides nutritional support and/or enhances cellular energy in a plant and/or a tree.

In an embodiment of the present disclosure, the biostimulant composition comprises from about 1% to about 99% w/w of an amino acid. In a further embodiment of the present disclosure, the amino acid is at least one of L or D-arginine, L or D-histidine, L or D-lysine, L or D-aspartic acid, L or D-glutamic acid, L or D-serine, L or D-threonine, L or D-asparagine, L or D-glutamine, L or D-cysteine, L or D-selenocysteine, L or D-glycine, L or D-proline, L or D-alanine, L or D-valine, L or D-isoleucine, L or D-leucine, L or D-methionine, L or D-phenylalanine, L or D-tyrosine and L or D-tryptophan.

In an embodiment of the present disclosure, the biostimulant composition comprises from about 1% to about 99% w/w of a polysaccharide. In a further embodiment of the present disclosure, the polysaccharide is at least one of cellulose, modified cellulose, starch, modified starch, amylopectin, modified amylopectin, amylose, modified amylose, chitosan, modified chitosan, chitin, modified chitin, guar gum, modified guar gum, locust bean gum, modified locust bean gum, tara gum, modified tara gum, konjac, modified konjac, fenugreek gum, modified fenugreek gum, mesquite gum, modified mesquite gum, aloe mannans, modified aloe mannans, carboxyalkylated cellulose, oxidized polysaccharides, sulfated polysaccharides, cationic polysaccharides, pectin, arabic gum, karaya gum, xanthan, kappa, iota or lambda carrageenans, agar-agar, or alginates. In an embodiment of the present disclosure, the polysaccharide comprises a chitosan of low molecular weight. In a further embodiment of the present disclosure, the polysaccharide comprises a chitosan having a molecular weight of less than 15000 kDa.

In an embodiment of the present disclosure, the biostimulant composition comprises from about 1% to about 99% w/w of a betaine. In a further embodiment of the present disclosure, the betaine is at least one of alkyl betaines, alkylamido betaines, glycine betaines, sulfobetaines, sulfite betaines, sulfato betaines, phosphinate betaines, phosphonate betaines, phosphito betaines, phosphato betaines, sulfonium betaines or phosphenium betaines.

In an embodiment of the present disclosure, the biostimulant composition comprises from about 1% to about 99% w/w of a polyol. In a further embodiment of the present disclosure, the polyol is at least one of monosaccharides, disaccharides and sugar alcohols. In yet a further embodiment of the present disclosure, the polyol is at least one of mannose, arabinose, xylose, ribose, apiose, rhamnose, psicose, fructose, sorbose, tagitose, ribulose, xylulose, erythrulose, maltose, kojibiose, nigerose, cellobiose, lactose, melibiose, gentiobiose, turanose, rutinose, trehalose, sucrose, raffinose, sorbitol, mannitol or galactitol.

In an embodiment of the present disclosure, the biostimulant composition comprises from about 1% to about 99% w/w of a plant hormone. In a further embodiment of the present disclosure, the plant hormone is at least one of abscisic acid, auxin, cytokinin, ethylene, gibberellin, brassinosteroid, jasmonate, salicylic acid or strigolactone.

In an embodiment of the present disclosure, the biostimulant composition comprises from about 1% to about 99% w/w of an enzyme. In a further embodiment of the present disclosure, the enzyme is at least one of amylase, cellulase, hemicellulase, sucrase, lipase, protease, maltase, xylanase, mannanase, galactase or b-glucanase. In an embodiment of the present disclosure, the enzyme or enzymes degrade the components of the composition into ingredients capable of being absorbed by the plants or crops.

In an embodiment of the present disclosure, the biostimulant composition further comprises an elicitor. In a further embodiment of the present disclosure, the elicitor comprises from about 1% to about 99% w/w of the composition. In yet a further embodiment of the present disclosure, the elicitor is at least one of a biotic or abiotic elicitor.

In an embodiment of the present disclosure, the biostimulant composition further comprises an agriculturally acceptable carrier. In a further embodiment of the present disclosure, the agriculturally acceptable carrier comprises from about 1% to about 99% w/w of the composition. In yet a further embodiment of the present disclosure, the agriculturally acceptable carrier is a polar carrier. In yet a further embodiment of the present disclosure, the polar carrier is at least one of water, alcohol or polyol.

In an aspect, the present disclosure relates to a kit comprising a biostimulant composition and an agriculturally acceptable carrier. In an embodiment of the present disclosure, the biostimulant composition comprises at least one of an amino acid; a polysaccharide; a betaine; a polyol; an enzyme; or a plant hormone; wherein the biostimulant composition provides nutritional support and/or enhances cellular energy in a plant and/or a tree. In an embodiment of the present disclosure, the biostimulant composition comprises an amino acid; a polysaccharide; a betaine; a polyol; an enzyme; and a plant hormone. In an embodiment of the present disclosure, the biostimulant composition provides nutritional support and/or enhances cellular energy in a plant and/or a tree. In yet a further embodiment of the present disclosure, the agriculturally acceptable carrier is a polar carrier. In yet a further embodiment of the present disclosure, the polar carrier is at least one of water, alcohol or polyol.

In an aspect, the present disclosure relates to the use of a biostimulant composition for enhancing biomass of a horticultural, arboricultural or an agricultural crop. In an embodiment of the present disclosure, the biostimulant composition comprises at least one of an amino acid; a polysaccharide; a betaine; a polyol; an enzyme; or a plant hormone; wherein the biostimulant composition provides nutritional support and/or enhances cellular energy in a plant and/or a tree. In an embodiment of the present disclosure, the biostimulant composition comprises an amino acid; a polysaccharide; a betaine; a polyol; an enzyme; and a plant hormone. In an embodiment of the present disclosure, the biostimulant composition provides nutritional support and/or enhances cellular energy in a plant and/or a tree. In yet a further embodiment of the present disclosure, the horticultural, arboricultural or agricultural crop comprises foods, fibers, fuels and raw materials. In yet a further embodiment of the present disclosure, enhancing biomass comprises enhancing the nutritional value of the biomass. In yet a further embodiment of the present disclosure, enhancing the nutritional value of the biomass comprises at least one of enhancing protein content, sugar content, trace element content, resistance to bruising, or preservation capacity.

In an aspect, the present disclosure relates to the use of a kit comprising a biostimulant composition and an agriculturally acceptable carrier for enhancing biomass of a horticultural, arboricultural or an agricultural crop. In an embodiment of the present disclosure, the biostimulant composition comprises at least one of an amino acid; a polysaccharide; a betaine; a polyol; an enzyme; or a plant hormone; wherein the biostimulant composition provides nutritional support and/or enhances cellular energy in a plant and/or a tree. In an embodiment of the present disclosure, the biostimulant composition comprises an amino acid; a polysaccharide; a betaine; a polyol; an enzyme; and a plant hormone. In an embodiment of the present disclosure, the biostimulant composition provides nutritional support and/or enhances cellular energy in a plant and/or a tree. In an embodiment of the present disclosure, the agriculturally acceptable carrier is a polar carrier. In yet a further embodiment of the present disclosure, the polar carrier is at least one of water, alcohol or polyol. In an embodiment of the present disclosure, the horticultural, arboricultural or agricultural crop comprises foods, fibers, fuels and raw materials. In an embodiment of the present disclosure, enhancing biomass comprises enhancing the nutritional value of the biomass. In an embodiment of the present disclosure, enhancing the nutritional value of the biomass comprises at least one of enhancing protein content, sugar content, trace element content, resistance to bruising, or preservation capacity.

In an aspect, the present disclosure relates to a method for enhancing biomass of a horticultural, arboricultural or an agricultural crop, the method comprising applying a biostimulant composition to a horticultural, arboricultural or an agricultural crop. In an embodiment of the present disclosure, the biostimulant composition comprises at least one of an amino acid; a polysaccharide; a betaine; a polyol; an enzyme; or a plant hormone; wherein the biostimulant composition provides nutritional support and/or enhances cellular energy in a plant and/or a tree. In an embodiment of the present disclosure, the biostimulant composition comprises an amino acid; a polysaccharide; a betaine; a polyol; an enzyme; and a plant hormone. In an embodiment of the present disclosure, the biostimulant composition provides nutritional support and/or enhances cellular energy in a plant and/or a tree. In an embodiment, the biostimulant composition further comprises an agriculturally acceptable carrier. In yet a further embodiment of the present disclosure, the agriculturally acceptable carrier is a polar carrier. In yet a further embodiment of the present disclosure, the polar carrier is at least one of water, alcohol or polyol. In yet a further embodiment of the present disclosure, applying the biostimulant composition comprises at least one of spray treatment, soil treatment, seed treatment or hydroponic treatment. In yet a further embodiment of the present disclosure, applying the biostimulant composition comprises foliar application. In yet a further embodiment of the present disclosure, the horticultural, arboricultural or agricultural crop comprises foods, fibers, fuels and raw materials. In yet a further embodiment of the present disclosure, enhancing biomass comprises enhancing the nutritional value of the biomass. In yet a further embodiment of the present disclosure, enhancing the nutritional value of the biomass comprises at least one of enhancing protein content, sugar content, trace element content, resistance to bruising, or preservation capacity. In yet a further embodiment of the present disclosure, the biostimulant composition is formulated in an aqueous solution at a concentration ranging from about 1% to about 99%.

The foregoing and other advantages and features of the present disclosure will become more apparent upon reading of the following non-restrictive description of illustrative embodiments thereof, given by way of example only with reference to the accompanying drawings/figures.

BRIEF DESCRIPTION OF THE DRAWINGS/FIGURES

In the appended drawings/figures:

FIG. 1 illustrates a photo of an agricultural field showing the production of soya (essentially Katonda R2) which has been treated with Fertiessential®, in accordance with an embodiment of the present disclosure. The right-hand side of the field has been subjected to the treatment with Fertiessential® whereas the left-hand side remained untreated. The middle portion of the field represents an area of the field that may have received some of the Fertiessential®. In a further embodiment of the present disclosure, 5 L/hectare (5 L of Fertiessential® were mixed with 200 L of water) was applied to the soya crop (Table 1).

Figure 2:
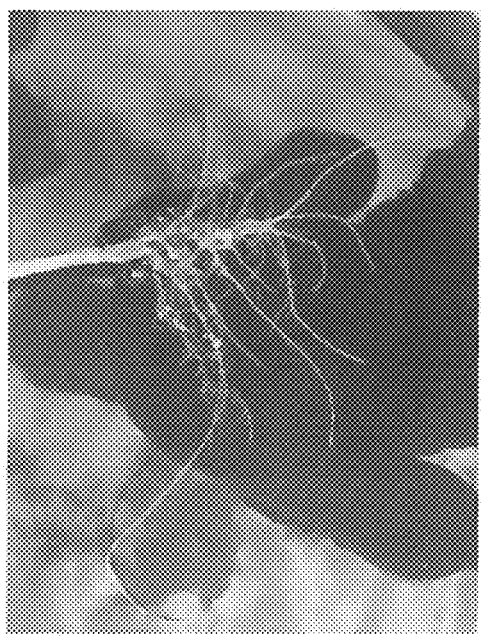
Figure 2:
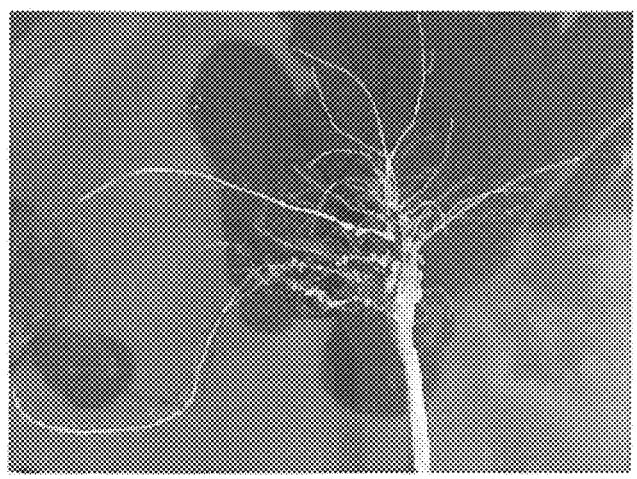
Figure 2:
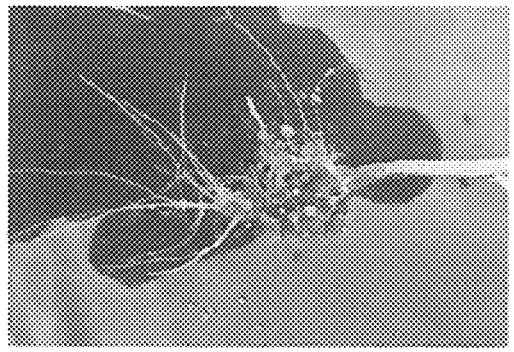
Figure 2:
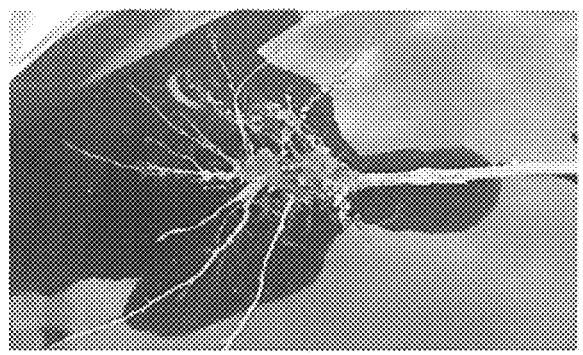
Figure 2:
Figure 2:
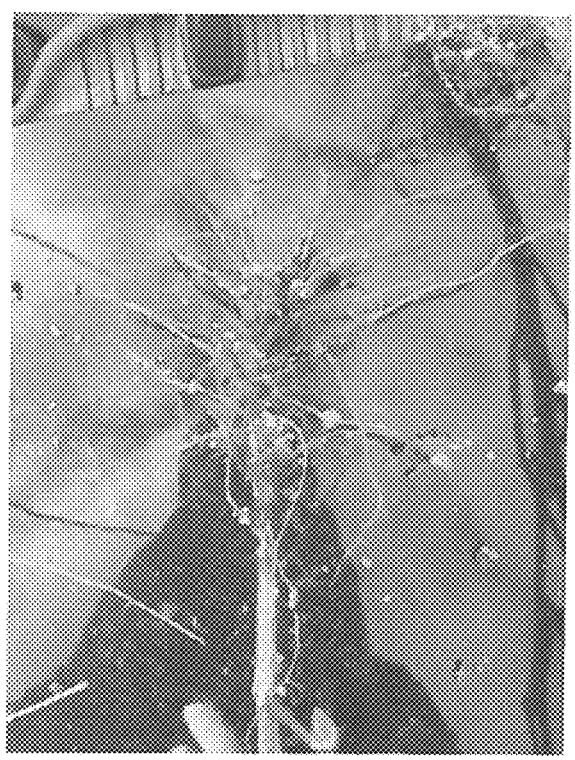
Figure 2:
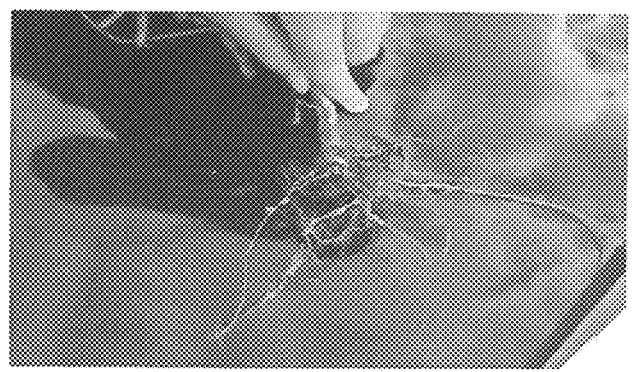
Figure 2:

FIG. 2 illustrates various photos of roots of soya plants. Photos A-D are photos of roots of soya plants which have not been subjected to treatment with Fertiessential® whereas photos E-H are photos of roots of soya plants which have been subjected to treatment with Fertiessential® in accordance with an embodiment of the present disclosure. A higher number of nodules/nodes have been identified on the treated plants as compared to the untreated ones. Moreover, the plants which have been subjected to treatment with Fertiessential® exhibit nodules/nodes on the secondary root structure. Furthermore, the nodules/nodes appearing on the treated plants are slightly bigger than those on the untreated plants.

Figure 3:

FIG. 3 illustrates a photo of treated (right-hand side facing the plants) and untreated soya plants (left-hand side facing the plants) in accordance with an embodiment of the present disclosure. The treated plants exhibit a more elaborate foliage.

DESCRIPTION

Glossary

In order to provide a clear and consistent understanding of the terms used in the present disclosure, a number of definitions are provided below. Moreover, unless defined otherwise, all technical and scientific terms as used herein have the same meaning as commonly understood by one of ordinary skill in the art to which this disclosure pertains.

The word "a" or "an" when used in conjunction with the term "comprising" in the claims and/or the disclosure may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this disclosure and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used in this disclosure and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±1% of the modified term if this deviation would not negate the meaning of the word it modifies.

The terms "enhance", "enhances" or "enhancing" with respect to the biostimulant compositions of the present disclosure as well as their uses and methods means that a desired effect is observed at least regarding the nutritional value, protein content, sugar content, trace element content, resistance to bruising, or preservation capacity of a given crop.

The term "biostimulant" as used herein refers to compositions that are not fertilizers nor pesticides, but which when applied to a plant will enhance the health and growth of a plant. In an embodiment of the present disclosure, the biostimulant compositions improve at least one of the nutritional value, protein content, sugar content, trace element content, resistance to bruising, or preservation capacity of a given crop.

The term "crop" as used herein includes any plant, tree or portion of a plant or tree grown or harvested for commercial or beneficial purposes. Non-limiting examples of crop cultures include agriculture, arboriculture and horticulture.

The term "amino acid" as used herein refers to an organic acid containing both a basic amino group and an acidic carboxyl group. Therefore, the molecule is amphoteric and exists in aqueous solution as dipole ions. In an embodiment of the present disclosure, the amino acids are the L-amino acids. They include but are not limited to the 25 amino acids that have been established as protein constituents. They must contain at least one carboxyl group and one primary or secondary amino group on the amino acid molecule. They include such proteinogenic amino acids as alanine, valine, leucine, isoleucine, norleucine, proline, hydroxyproline, phenylalanine, tryptophan, methionine, glycine, serine, threonine, cysteine, tyrosine, asparagine, glutamine, aspartic acid, glutamic acid, lysine, hydroxylysine, ornithine, arginine, histidine, penicillamine and the like. In an embodiment of the present disclosure, the amino acids are the D-amino acids. In an embodiment of the present disclosure, the amino acids are a mixture of the L- and the D-amino acids.

The term "phytohormone" or "plant hormone" as used herein refers to any of the hormones produced naturally in plants or an artificial plant growth substance, that are active in minute amounts in controlling growth and other functions of the plant. Non-limiting examples include auxins, cytokines and gibberellins.

The term "elicitor" as used herein encompasses compounds of biological and non-biological origin that cause an increase in secondary metabolite production when applied to plants or plant-cell cultures. Many different and diverse compounds can act as elicitors, depending upon their nature of origin and their mode of action with cellular metabolism. Generally, elicitors may be characterized into classes of biotic elicitors and abiotic elicitors.

In an aspect of the present disclosure relates to biostimulant compositions for enhancing the biomass of a horticultural, arboricultural or an agricultural crop. In an embodiment of the present disclosure, enhancing the biomass comprises enhancing the nutritional value of the biomass. In an embodiment of the present disclosure, enhancing the nutritional value of the biomass comprises at least one of enhancing protein content, sugar content, trace element content, resistance to bruising, or preservation capacity.

In an aspect of the present disclosure, the biostimulant compositions provide nutrients for a crop's metabolism, stimulating its growth. In an embodiment, the present disclosure relates to a biostimulant composition trademarked under the name of Fertiessential®. In an embodiment, the present disclosure relates to a biostimulant composition trademarked under the name of Fertiroots®.

In an embodiment of the present disclosure, the biostimulant composition comprises at least one of an amino acid; a polysaccharide; a betaine; a polyol; an enzyme; or a plant hormone; wherein the biostimulant composition provides nutritional support and/or enhances cellular energy in a plant and/or a tree. In an embodiment of the present disclosure, the biostimulant composition comprising an amino acid; a polysaccharide; a betaine; a polyol; an enzyme; and a plant hormone. In an embodiment of the present disclosure, the biostimulant composition provides nutritional support and/or enhances cellular energy in a plant and/or a tree. In an embodiment of the present disclosure, the biostimulant composition comprises proline. Proline has the effect of strengthening the cell walls and regulating the amount of water in the cells to keep the cells hydrated and healthy in stressful situations. In an embodiment, the polysaccharides (e.g. complex carbohydrates) trigger antioxidant production in the plants. In an embodiment, the betaines act as osmolytes, helping to adjust the levels of water, salt and other substances in the plant cells. In an embodiment, the biostimulant composition comprises mannitol. Mannitol is a sugar alcohol that helps regulate the amount of water in the plant cells, keeping the cells hydrated.

In an aspect, the biostimulant compositions of the present disclosure provide nutritional support necessary for growth and homeostasis as well as cellular support. In an embodiment of the present disclosure, the biostimulant compositions promote germination and root development. Indeed, a more developed root system allows for a more efficient absorption and transfer of nutrients and water throughout the growth season. In an embodiment of the present disclosure, the biostimulant compositions assist the plants when under physiological stress, thus maintaining its growth even when subjected to biotic or abiotic stresses.

A maize crop typically has about 60 days between pollination and maturity to develop its grains. For a crop yield of 12 tons per hectare (t/ha), this represents about 200 kg per day per hectare. For each day of stress during which the plant protects itself instead of absorbing water and minerals, there is a loss in terms of growth and/or nutritional value. For instance, to better quantify the typical yield gains observed in a treated crop with the biostimulant compositions of the present disclosure, the yield is increased by about 20% in a potato crop and by 10-15% in a soybean crop and a corn crop. Moreover, the nutritional value in these crops is also improved. Indeed, Gramineae and protein crops treated with the biostimulant compositions of the present disclosure exhibit higher biomass yields as well as improved nutritional values (e.g. higher starch, fatty acid and protein levels).

EXPERIMENTAL

A number of examples are provided herein below illustrating the use of the biostimulant compositions of the present disclosure. The following non-limiting examples are illustrative of the present disclosure.

Field Crops

A single foliar application at a precise stage of growth is recommended. Maize's grain and Maize's silage, about 1 L/acre or about 2.5 L/ha Fertiroots®. Soybean, about 1 L/acre or about 2.5 L/ha Fertiessential®. Wheat, about 1 L/acre or about 2.5 L/ha Fertiroots®. Canola, about 1 L/acre or about 2.5 L/ha Fertiessential®. Forage plants, about 1 L/acre or about 2.5 L/ha of Fertiroots®.

Fertiroots® Composition

Ascophyllum Nodosum
Cane molasses
Fish hydrolizat (Oramatik k)
Humic acid (ACTIV80 OS)
Yucca Schidegara (Biosol)
IAA {Indole-3-acetic acid}
IGA {Giberellic acid}
L-Alanine
L-Arginine HCL
L-Aspartic acid
Beta-alanine
L-Carnosine
L-Citruline
L-Cysteine HCL
Glycine
L-Glutamine
L-Histidine
L-isoleucine
L-Leucine
L-Lysine
L-Methionine
L-Phenylalanine
L-Proline
L-Serine
Taurine
L-Threonine
L-Tyrosine
L-Valine
L-Tryptophane
Vitamine B6 (pyridoxine)
Vitamine B2 {Riboflavine}
Sulfate de fer 20% Fe
Maltodextrin
Inulin
Enzymes
Citric acid
Osmosis Water
Total amino acids are 0.9%

Fertiessential® Composition

Ascophyllum Nodosum
Organic Fenugreek (water extract)
Yucca Schidegara (Biosol) (OMRI)
Glycine Betaine (TrimethylQlycinel
White willow bark 15% organic
BRINERS CHOICE™ Chloride calcium
Epsom salt
Coenzyme Q10
spirulina and chlorella organics
L-Arginine HCL
L-Aspartic acid
L-omithine HCL
L-Citrulline
L-Cysteine HCL
Glycine
L-Glutamine
L-Histidine
L-Isoleucine
L-Leucine
L-Lysine
L-Methionine L-Phenylalanine
L-Proline
L-Serine
Taurine
L-Threonine
L-Tyrosine
L-Valine
L-Tryptophane
Vitamine B1 (Thiamine HCL)
Vitamine B2 (Riboflavine)
Vitamine B5 (D-Calcium Pentothanate)
Vitamine B12(cyanocobalamin, 100%)
Vitamine B7 (Biotin, 100%)
Vitamine B9 (Acide foliQue)
Enzymes (Oigeseb plus)
Citric acid
Osmosis Water
Total amino acids L are 0.9%

Vegetable Crops

An application of a mixture of Fertiroots® and Fertiessential® to about 1.5 L/acre/product. A single application in fields, two to three applications in greenhouses and two to three applications on golf courses and lawns.

Ornamental Plants

A foliar application of about 7 ml/L of Fertiroots®, for bud break and for rooting seedlings. Then, later in the season, another foliar application of about 7 ml/L of Fertiessential® followed by two to three foliar applications per week for improved vigor and health of plants and flowers.

TABLE 1

Test Results for Soy Plants Treated with the Compositions of the Present Disclosure.

| | Plant | Number of pods | Number of leaves | Number of branches | Length (inches) |
|---|---|---|---|---|---|
| Treated plants | 1 | 55 | 78 | 11 | |
| | 2 | 45 | 71 | 11 | |
| | 3 | 61 | 89 | 12 | |
| | 4 | 111 | | 17 | |
| | Average | 53.66 (without the No. 4 plant) | 79.33 | 12.75 | 35.25 |
| Untreated plants | 1 | 39 | 50 | 12 | |
| | 2 | 44 | 45 | 9 | |
| | 3 | 54 | 54 | 12 | |
| | 4 | 48 | 45 | 11 | |
| | Average | 46 | 48.5 | 11 | 33.75 |
| | Difference | 7.66 | 30.83 | 1.75 | 1.5 |

While the present disclosure has been described with reference to illustrative examples, it is to be understood that the disclosure is not limited to the disclosed examples. To the contrary, the disclosure is intended to cover various modifications and equivalent arrangements included within the spirit and scope of the appended claims.

The invention claimed is:

1. A biostimulant composition comprising:
L-arginine, L-histidine, L-lysine, L or D-aspartic acid, L or D-glutamic acid, L-serine, L-threonine, L or D-asparaciine, L-glutamine, L or D-cysteine, L or D-selenocysteine, L or D-glycine, L-proline, L or D-alanine, L-valine, L-isoleucine, L-leucine, L-methionine, L-phenylalanine, L-tyrosine, L-tryptophan, L-ornithine, L-Citrulline and taurine;
cane molasses;
glycine betaine;
a polyol;
an enzyme; and
an agriculturally acceptable carrier;
wherein the total amino acids are 0.9%;
wherein the biostimulant composition provides nutritional support and/or enhances cellular energy in a plant and/or a tree.

2. The biostimulant composition of claim 1, further comprising:
a plant hormone.

3. The biostimulant composition of claim 1, wherein the polyol is at least one of monosaccharides, disaccharides and sugar alcohols.

4. The biostimulant composition of claim 1, wherein the polyol is at least one of mannose, arabinose, xylose, ribose, apiose, rhamnose, psicose, fructose, sorbose, tagatose, ribulose, xylulose, erythrulose, maltose, kojibiose, nigerose, cellobiose, lactose, melibiose, gentiobiose, turanose, rutinose, trehalose, sucrose, raffinose, sorbitol, mannitol or galactitol.

5. The biostimulant composition of claim 2, wherein the plant hormone is at least one of abscisic acid, auxin, cytokinin, ethylene, gibberellin, brassinosteroid, jasmonate, salicylic acid or strigolactone.

6. The biostimulant composition of claim 1, wherein the enzyme is at least one of amylase, cellulase, hemicellulase, sucrase, lipase, protease, maltase, xylanase, mannanase, galactase or β-glucanase.

7. The biostimulant composition of claim 1, further comprising an elicitor.

8. The biostimulant composition of claim 7, wherein the elicitor is at least one of a biotic or abiotic elicitor.

9. The biostimulant composition of claim 1, wherein the agriculturally acceptable carrier is a polar carrier.

10. The biostimulant composition of claim 9, wherein the polar carrier is at least one of water, alcohol or polyol.

11. A method for enhancing biomass of a horticultural, arboricultural or an agricultural crop, the method comprising applying the biostimulant composition of claim 1 to a horticultural, arboricultural or an agricultural crop.

12. The method of claim 11, wherein applying the biostimulant composition comprises at least one of spray treatment, soil treatment, seed treatment or hydroponic treatment.

13. The method of claim 12, wherein spray treatment comprises foliar application.

14. The method of claim 11, wherein the horticultural, arboricultural or agricultural crop comprises foods, fibers, fuels and raw materials.

15. The method of claim 11, wherein enhancing biomass comprises enhancing the nutritional value of the biomass.

16. The method of claim 15, wherein enhancing the nutritional value of the biomass comprises at least one of enhancing protein content, sugar content, trace element content, resistance to bruising, or preservation capacity.

* * * * *